United States Patent [19]

Urban

[11] Patent Number: 5,062,564
[45] Date of Patent: Nov. 5, 1991

[54] RAPID RESPONSE SOLDERING STATION
[75] Inventor: Paul L. Urban, Cheraw, S.C.
[73] Assignee: Cooper Industries, Houston, Tex.
[21] Appl. No.: 442,219
[22] Filed: Nov. 28, 1989
[51] Int. Cl.$^5$ .......................... B23K 3/03; H05B 1/02
[52] U.S. Cl. ......................................... 228/9; 228/53; 228/102; 219/241
[58] Field of Search .................... 228/51, 53, 55, 8, 9, 228/102; 219/229, 241; 76/1, 101 D

[56] References Cited

U.S. PATENT DOCUMENTS

| 2,582,481 | 1/1952 | Dvorak et al. | 219/26 |
| 2,735,923 | 2/1956 | Juvinall | 219/26 |
| 2,747,074 | 5/1956 | Finch | 219/241 |
| 3,618,590 | 11/1971 | Yardley et al. | 219/241 |
| 3,654,427 | 4/1972 | Schoenwald | 219/241 |
| 4,530,456 | 7/1985 | Michelotti | 228/9 |
| 4,654,507 | 3/1987 | Hubbard et al. | 219/241 |
| 4,822,979 | 4/1989 | de Kam | 219/241 |
| 4,891,497 | 1/1990 | Yoshimura | 219/241 |

FOREIGN PATENT DOCUMENTS

| 4035 | 3/1979 | European Pat. Off. | |
| 0315974 | 5/1989 | European Pat. Off. | |
| 0337065 | 10/1989 | European Pat. Off. | 228/9 |

OTHER PUBLICATIONS

Frederickson, M. D., *Electronic Manufacturing*, Sep. 1989, p. 26.
Piper, C. M. and Frederickson, M. D.

Primary Examiner—Samuel M. Heinrich
Attorney, Agent, or Firm—Kenyon & Kenyon

[57] ABSTRACT

A soldering tip is provided with a sensor to sense soldering tip temperature during a soldering cycle. The sensor is embedded in the soldering tip and positioned immediately adjacent to the tip's working surface. The sensor location provides rapid response to changing conditions at the tip's working surface. A microprocessor, responsive to the sensor, is provided to process the tip temperature data to control the power delivered to the heater which provides heat to the soldering tip. A visual and/or audio display also can be coupled to the processor. The microprocessor can be coupled to a further processor having long-term memory so that the collected data may be subsequently retrieved and displayed.

36 Claims, 5 Drawing Sheets

RAPID RESPONSE SOLDERING STATION

TECHNICAL FIELD

The present invention relates to soldering generally, and more particularly to a soldering station having an improved soldering tip temperature sensing arrangement and processing circuitry responsive thereto.

BACKGROUND OF THE INVENTION

In manual conduction soldering, heat is conducted from the soldering tip to the soldering connection. That heat activates the flux, melts the soldering alloy so that it may wet the base metal and permits the distribution of the solder by capillary action.

The procedures selected to make the soldered joint should provide the proper soldering temperature, heat distribution, and ratio of heating and cooling commensurate with the properties of the base metal and requirements of the finished product. Therefore, it is apparent that a stable soldering temperature contributes to the reliability of a soldered assembly and permits the production of a properly soldered assembly to be readily repeated. However, thermal losses occur at the soldering tip as the heat is absorbed by the connection. More specifically, the soldering tip temperature decreases during the soldering operation in accordance with the mass and thermal characteristics of the tip and connection as well as the thermal power capability of the soldering iron.

Attempts to vary the heat delivered to the soldering tip in accordance with tip loading have included electronically controlled soldering tools having sensors disposed in a location remote from the soldering tip's working surface. Among the drawbacks of these systems is their slow response to actual tip loading due to the remote sensor location. A slow response time will preclude the control device from immediately turning the heater on after the tip is loaded resulting in excessive tip temperature drop. Furthermore, the slow response time will preclude the control device from immediately turning the heater off after the tip is unloaded resulting in excessive tip temperature overshoot. Another drawback of these systems is the inability of the remotely positioned sensor to measure the actual tip temperatures, i.e., the temperature of the tip's working surface, which results in the collection of inaccurate, and possibly inconsistent temperature data. Furthermore, these problems are exacerbated under conditions where the tip is placed under a relatively light load.

Accordingly, there is a need to provide a heating system that would rapidly respond to these thermal losses to maintain a more constant soldering temperature.

The operator also contributes to temperature drop in manual conduction soldering, for example, by controlling the travel speed of the soldering tip along the connection. Thus, it is important to control operator techniques so that the operator spends consistent amounts of time during the connection interval for similar assemblies. Previous attempts to monitor the manual soldering process and gather information associated with heat transfer at the soldering connection also have included placing temperature sensors in the vicinity of the connection, i.e., spaced from the working surface of the soldering tip. However, among the drawbacks of these systems include distinguishing the data associated with certain soldering operations that make-up a cycle, i.e., distinguishing the time the operator spends soldering, cleaning the tip to remove oxides and solder therefrom (sponge wipe) and transporting the tip to a connection. It is particularly difficult to distinguish the data associated with the sponge wipe(s) from that associated with the soldering operation. This is due to the fact that the soldering tip temperature profile decays during both the sponge wipe and soldering operations. Thus, there is a need to develop a system that can collect tip temperature data and present the temperature-time profile therefor in a manner such that the data associated with each soldering operation can be readily distinguished.

SUMMARY OF THE INVENTION

The present invention is directed to a soldering tip assembly that avoids the problems and disadvantages of the prior art through the provision of a sensor which is placed within the soldering tip for sensing local temperature. The sensor is embedded immediately adjacent to the working surface of the soldering tip, i.e., the surface which contacts the soldering connection. With the sensor embedded in the soldering tip as close as possible to the working surface, rapid response to actual heat transfer dynamics may be achieved.

A processor, e.g., a microprocessor, coupled to this sensor arrangement to control the power delivered to the soldering tip rapidly responds to tip loading, and thus precisely controls tip temperature. Such temperature control permits the operator to consistently solder assemblies to specification or standard. The processor also can be used to store the temperature-time data for subsequent retrieval. This feature can be used for documentation.

A display can be coupled to the processor to monitor and/or record the tip temperature. For example, the temperature-time profile can be transmitted to a chart recorder or a video screen. Due to the rapid response characteristic of the sensor arrangement, the operator can use the display as a training tool. For example, when reviewing recorded tip temperature time data, each soldering operation can be distinguished. Furthermore, tip temperature fluctuations can be monitored almost exactly as they happen.

Another feature of the present invention is the provision of a spacer between the soldering tip and the contacts to which the sensor leads are coupled. As a result of this arrangement, the heat generated at the soldering tip is less likely to cause the contacts to oxidize.

A further feature of the present invention is the provision of good thermal contact between the sensor and the soldering tip. Such contact contributes to the accuracy of the collected tip temperature data.

DETAILED DESCRIPTION OF THE PREFERRED EMBODIMENTS

Figure 1:
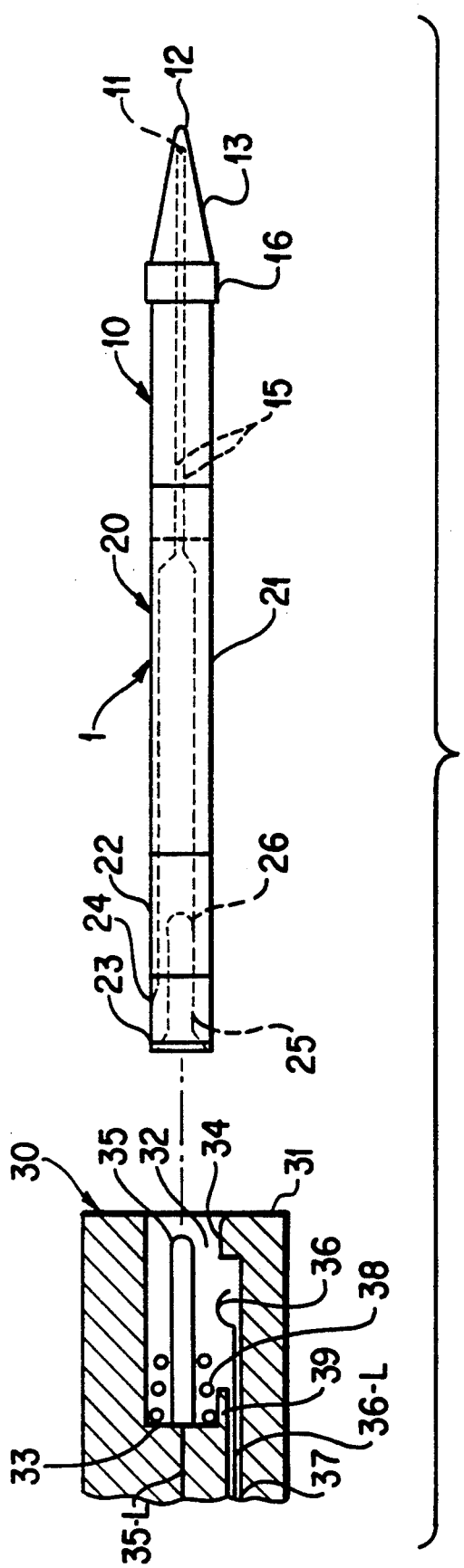
FIG. 1 is a side elevational view of the soldering tip sensor assembly together with a partial cross-sectional view of the receptacle therefor in accordance with the principles of the invention.

Referring to the drawings in detail wherein like numerals indicate like elements, FIG. 1 shows the soldering tip-sensor assembly and receptacle therefor in accordance with the principles of the present invention, wherein soldering tip-sensor 1 comprises soldering tip 10 and coupling portion 20.

Soldering tip 10 includes thermal sensor 11 embedded immediately adjacent to working surface 12, i.e., the surface which actually contacts the soldering connection. Sensor 10 is placed a distance about 0 to 2.5 mm from working surface 12 of the soldering tip so that the sensed temperatures will essentially correspond to the actual temperatures at the soldering tip's working surface. However, in order to place sensor 10 within about 0 to 2.5 mm of the tip's working surface, the sensor diameter should be limited to a maximum of 0.5 mm. Due to this sizing requirement, a thermocouple is used for sensor 11. The interface between sensor 11 and soldering tip 10 must provide optimum heat transfer characteristics to enable the sensor to accurately pickup the working surface temperatures. Thus, the material used to join the sensor to the soldering tip must have a suitable thermal conductivity. The sensor to tip connection also should be made without developing air pockets between the sensor and the soldering tip. To this end, sensor 11 can be, for example, joined to soldering tip 10 with glass or ceramic material, or brazed thereto with silver solder. Alternately, soldering tip 10 may be swaged to suitably secure the sensor to the soldering tip. The sensor also may have a stainless steel jacket to improve thermal conductivity as well as the structural integrity of the thermocouple.

The sensor can be embedded in soldering tip 10 in accordance with the following procedures. The soldering tip, which is made from a material having high thermal conductivity such as copper, is provided with hole or bore 14 extending along the longitudinal axis of tip 10. This may be accomplished by machining the tip to form the hole therein or by staring with a piece of tubing such as 0.250 O.D. × 0.109 wall tubing. A pin is inserted in the hole of the prefabricated tip or of the tubing. Then it is translated therethrough to within about 2 to 2.5 mm of the other end of the hole. As the tip or tubing is swaged to collapse that 2 to 2.5 mm section of the hole, the pin prevents the remaining portion of the hole from collapsing. Then, the pin is removed. Alternatively, the last 2-2.5 mm of the hole may be plugged with a copper pin which is brazed to the tip with silver solder. The thermocouple, which preferably has a stainless steel jacket and a 0.020 inch O.D., is inserted in the hole and bonded to the collapsed or plugged portion of the hole with glass material, or it is ceramic or brazed thereto with silver solder to provide a suitable thermal connection between the thermocouple and the soldering tip. In lieu of such joining or bonding techniques, the tip can be swaged to securely connect the thermocouple to the tip.

Returning to FIG. 1, soldering tip 10 is illustrated with tapered section 13. This tip configuration optimizes heat transfer from the tip to the connection. However, it should be understood that other tip configurations may be used. Tip 10 may include collar 16 to couple the heater (not shown) to the soldering tip. Accordingly, collar 16 may, for example, be threaded. Tip 10 also is provided with annular recess 17 (FIG. 2) for receiving coupling portion 20 which couples soldering tip 10 to receptacle 30.

Coupling portion 20 comprises tubular extension 21, tubular insulator 22 and contact ring 23. Soldering tip 10 is press-fit into one end of extension 21 via annular recess 17. The other end of extension 21 also can be provided with an annular recess (not shown) so that it may be press-fit into tubular insulator 22 which can be coupled to contact ring 23 through a similar connection (not shown). However, other coupling mechanisms may be used to couple the soldering tip, extension, insulator and contact ring together.

Figure 2:
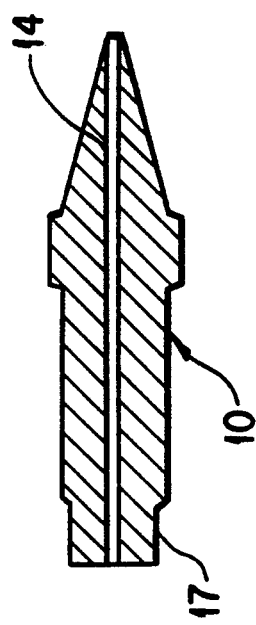
FIG. 2 is an enlarged, longitudinal cross-section of the soldering tip prior to the positioning of the sensor therein.

Referring to FIGS. 1 and 2, sensing leads 15 extend from sensor 11 to the other end of tip-sensor assembly 1 through hole 14, which is provided in tip 10, and then through coupling portion 20. One of the leads is connected to outside contact ring 23 at contact point 24 while the other lead is connected to inside contact 25 at contact point 26. As can be understood while viewing FIG. 1, inside contact 25 extends into the end of tip-sensor assembly 1 opposite working surface 12. Inside contact 25 is in the form of a sleeve, socket or female connector. To prevent short-circuiting between contact ring 23 together with its associated lead and inside contact 25 together with its associated lead, insulation (not shown) is provided therebetween.

Extension 21 spaces sensor contacts 23-26, as well as receptacle contacts 34, 36 (described below), from heat generated in the vicinity of the soldering tip. This arrangement prevents these contacts from being subjected to elevated soldering temperatures which otherwise would rapidly oxidize these contacts. Such oxidation reduces conductivity between contacts and eventually may lead to circuit failure. The contacts also may be gold plated to further protect them against oxidation.

Extension 21 not only spaces the soldering tip from the sensor contacts, but also supports the soldering tip at one end of coupling portion 20. Thus, extension 21 must have good mechanical properties, e.g., strength, under elevated temperatures. Accordingly, extension 21 should be made from material that can meet these requirements such as stainless steel or brass. It follows that coupling portion 20 is provided with insulator 22 to electrically insulate contacts 23-26 from extension 21.

The receptacle which is coupled to the handle of the soldering iron, and which receives soldering tip-sensor assembly 1 is generally designated with reference numeral 30. Receptacle 30 comprises housing 31 which has opening 32 formed therein. The opening is sized to receive one end of coupling portion 20. Within opening 32, inside contact 35 extends from wall 33 of housing 31. Inside contact 35 is in the form of a prong so that it may be inserted into inside contact 25 which is in the form of a socket. Outside contact 36 has a convex surface which extends radially within opening 32 so that it engages with the outer surface of outside contact ring 23 when ring 23 is inserted into opening 32. However, to avoid axial deformation of outside contact 36, housing 31 is provided with lip 34 which extends radially inwardly slightly less than outside contact 36. Thus, as coupling portion 20 is inserted into opening 32, lip 34 guides contact ring 23 toward the top of the convex portion of outside contact 36. As a result, contact ring 32 slides over outside contact 36 without axially deforming the same. Lead 35-L extends from inside contact 35 and lead 36-L extends from outside contact 36 through passageway 37. These leads couple the sensor to a microprocessor or other control, storage or display circuitry described below.

After tip-sensor assembly 1 is inserted through an opening in the heater (not shown), and then into opening 32 of receptacle 30, a conventional tension-nut assembly can be used to lock coupling portion 20 in the receptacle.

Coil spring 38 is provided to urge coupling portion 20 away from receptacle 30 when removing coupling portion 30 from the receptacle. To this end, coil spring 38 is seated in opening 32 about inside contact 35. When the coil spring is included, housing 31 further includes projection 39 which, as can be understood from the drawings, is positioned to maintain spring 38 centered about inside contact 35. Projection 39 is made from a material that enables it to electrically insulate outside contact 36 from coil spring 38.

Figure 3:
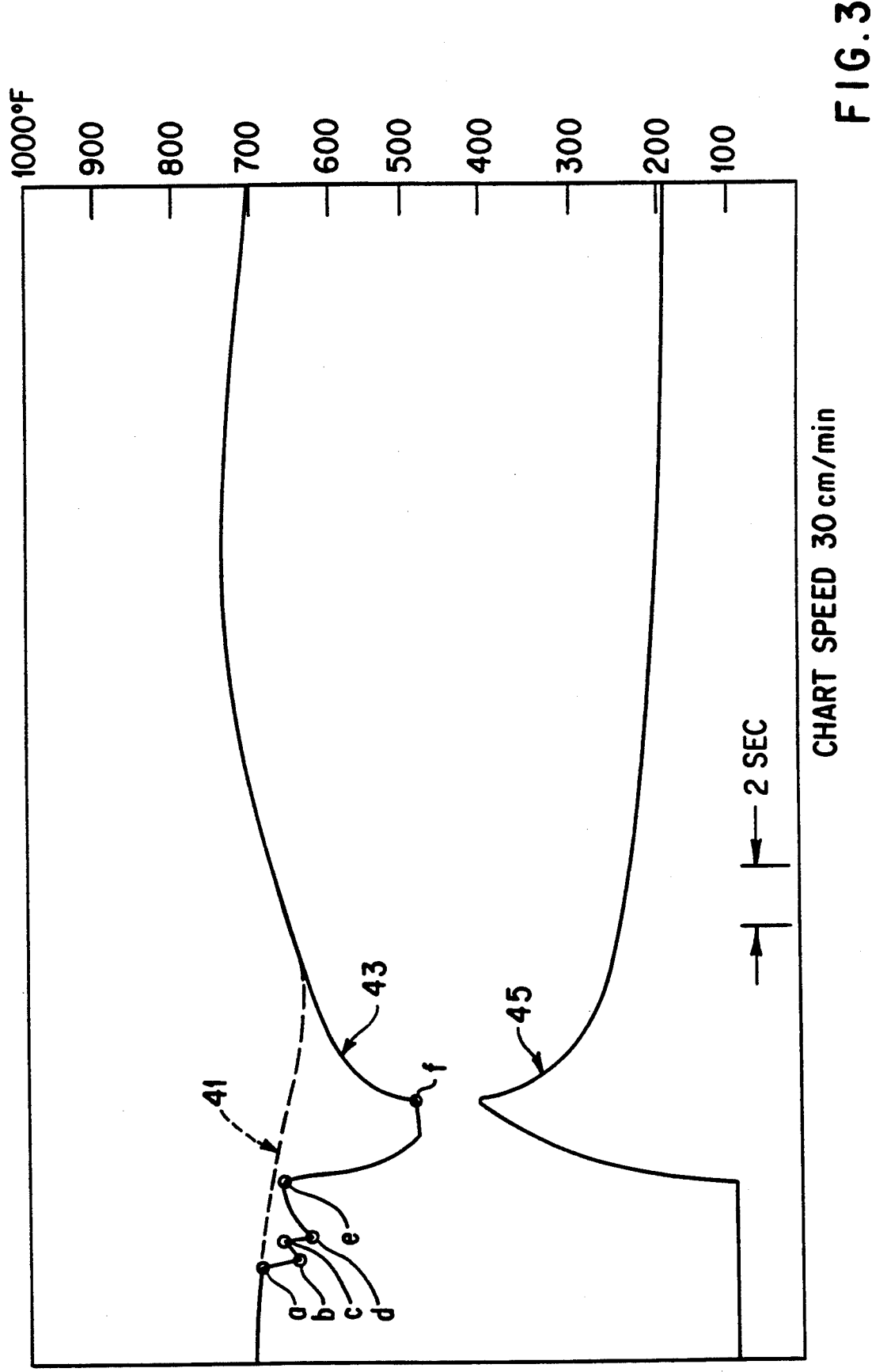
FIG. 3 is an example of a temperature-time plot illustrating response time.
Figure 4:
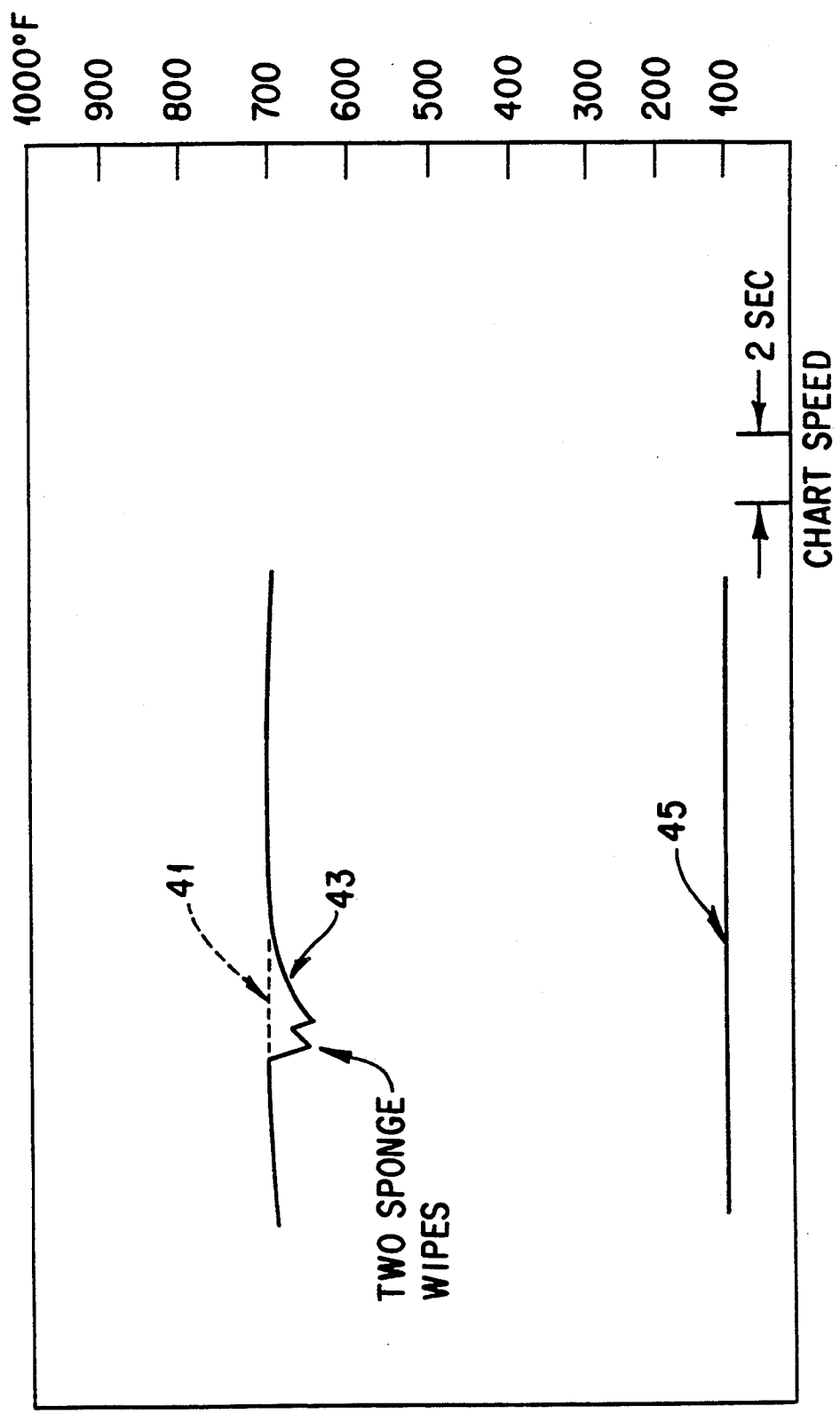
FIG. 4 is an example of a temperature-time plot graphically illustrating two sponge wipes.

FIGS. 3 and 4 illustrate the effect of the thermal sensor location on the temperature profile. Referring to FIG. 3, the dashed line, designated with reference numeral 41, represents a temperature-time plot over a soldering cycle based on information received by a sensor remotely positioned from the working surface of a soldering tip, i.e., 0.375 inches from the working surface. In contradistinction, solid line 43 represents a temperature-time plot of the soldering cycle based on information received by a sensor positioned at the working surface of the soldering tip. When comparing these temperature profiles with line 45, which represents the actual temperature of the soldering connection that in this example happens to be copper, it can be understood that unlike the sensor arrangement which sense the information depicted by line 41, the sensor positioned at the tip's working surface rapidly responds to tip loading. Furthermore, the distinct curves along line 43 permits the intervals which reflect specific soldering operations to be easily discriminated. More specifically, intervals a—b, c—d, d—e and e—f represent a sponge wipe in one direction along the tip, a sponge wipe in another direction along the tip, transporting the tip to the connection and soldering. However, line 41 illustrates that a remote sensor provides information that virtually does not differentiate these intervals. Thus, it can be understood that a sensor placed at the tip's working surface or immediately adjacent thereto provides information which, when transmitted to control circuitry permits that circuitry to rapidly respond to tip loading and to actuate or deactuate the soldering tip heater accordingly. Such a sensor arrangement also permits display and storage of the actual time that the operator spends during each soldering operation together with corresponding tip temperatures.

Figure 5:
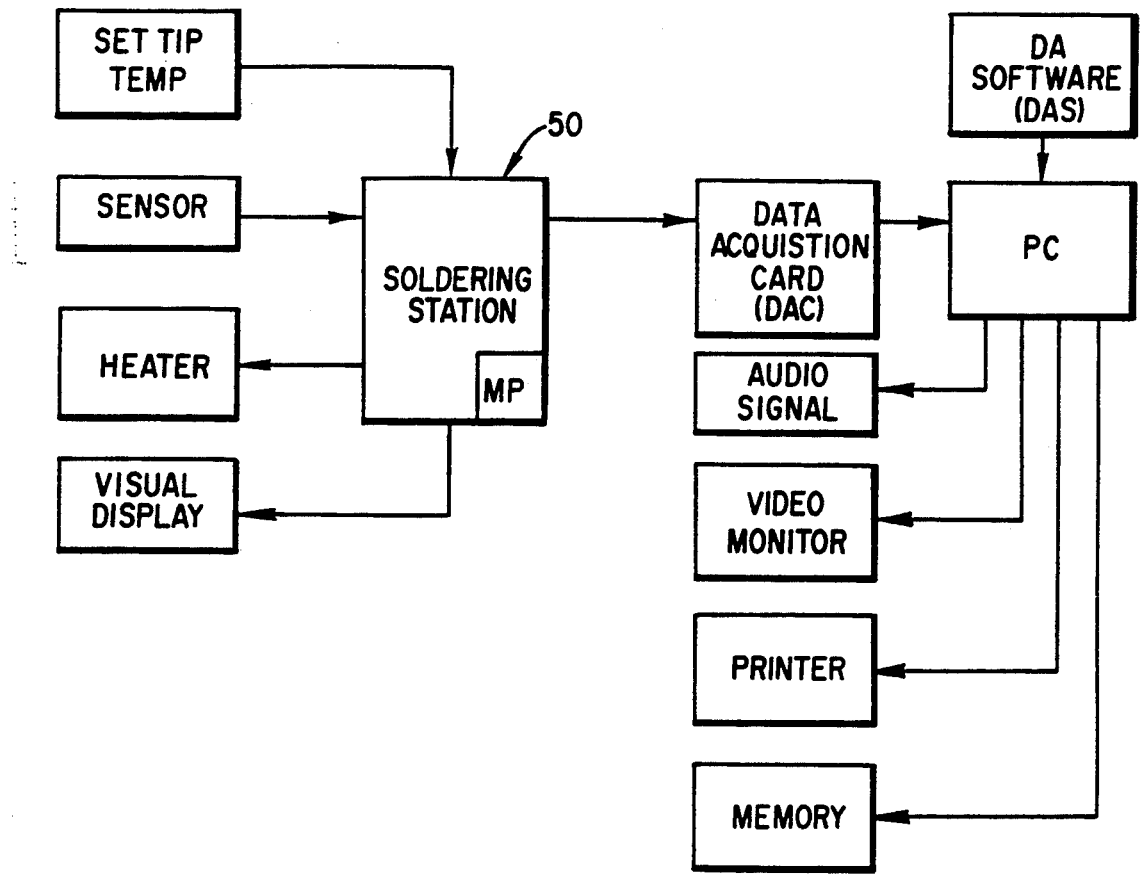
FIG. 5 is a schematic diagram illustrating the control, display and storage capacity of the soldering station.

FIG. 5 diagramatically represents the soldering station control, display and data storage arrangement. The soldering station comprises a soldering iron having a heater coupled to the soldering tip (not shown) and a control circuit such as a microprocessor MP. First, a predetermined soldering tip temperature is input into soldering station 50. Throughout the soldering cycle, the sensor, e.g., the thermocouple, embedded in the soldering tip, senses the tip temperature and sends a signal, which corresponds to the sensed temperature, to microprocessor MP. Microprocessor MP then compares the predetermined and sensed temperature values and increases the power delivered to the heater, which preferably is a resistor, when the difference between the sensed and predetermined values is below a lower limit. On the other hand, microprocessor MP decreases the power delivered to the heater when the difference between the sensed and predetermined values is above an upper limit.

Microprocessor MP also processes the sensor's signal to be visually displayed, for example, on a chart recorder or video screen. Thus, the system can provide instant feedback to the operator while soldering. Microprocessor MP also can send a signal to a devise to produce an audio signal to indicate to the operator that the soldering tip temperature is beyond the predetermined range. Furthermore, microprocessor MP can superimpose the sensed tip temperature excursion over an ideal temperature excursion for the size of the load and tip style. This information can be displayed further to assist in operator training.

The data acquisition card DAC provides an interface buffer between the soldering station microprocessor and another processor such as personal computer PC. More specifically, data acquisition card DAC receives and/or formats information received from the soldering station microprocessor for subsequent use by another processor, such as personal computer PC. The data acquisition software DAS is provided to the PC to process the information received from the DAC for display or for putting that information into long-term memory. The data acquisition software DAS also can be used with the PC to retrieve and display any information put in memory. Various modes of display include audio signals which indicate tip temperatures above or below preselected boundaries, and visual displays, such as video screens or monitors, or printers.

Figure 6:
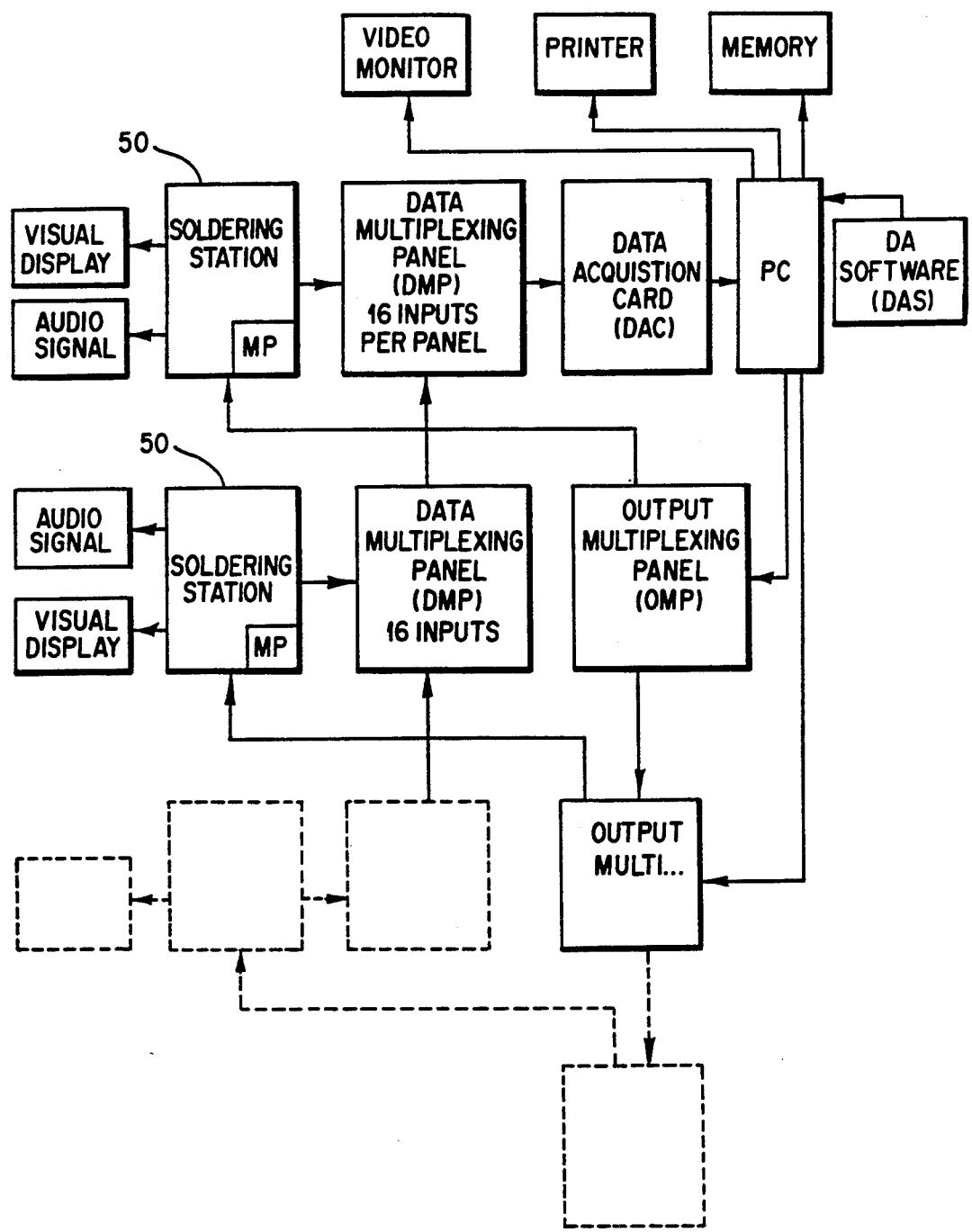
FIG. 6 is a schematic diagram illustrating a number of soldering stations integrated for a production system.

FIG. 6 diagramatically represents a number of soldering stations integrated for production. As evident from FIG. 6, a large number of soldering stations 50 each having a microprocessor MP, can be coupled to a central PC via separate data and output multiplexing panels DMP, OMP. For example, each DMP can be designed to handle up to 16 soldering station inputs, with the maximum number of inputs or stations being 256. Data is stored in a respective soldering station microprocessor until central PC is ready to process that data. The PC program downloads that data clears that station's temporary memory, processes that data and stores or displays it. The program sequentially proceeds to each station repeating the above steps. Furthermore, if central PC goes down, each satellite soldering station's microprocessor can continue to display or store the sensed information, or control tip temperature in response thereto.

I claim:

1. A soldering tip for conducting heat from a heat source external to said soldering tip to an application site, comprising:
    a heat receiving end including means for coupling the soldering tip to an external heat source;
    a heat emitting end forming a working surface for contacting an application site and conducting heat thereto; and
    a sensor for sensing local temperature embedded within the soldering tip immediately adjacent said working surface.

2. The soldering tip of claim 1 wherein the sensor is spaced from said working surface a distance about 0 to 2.5 mm therefrom.

3. The soldering tip of claim 2 wherein said sensor is spaced about 2 mm from said working surface.

4. The soldering tip of claim 1 wherein said sensor is a thermocouple.

5. The soldering tip of claim 4 wherein said thermocouple is encased in stainless steel.

6. The soldering tip of claim 1 wherein said sensor is jointed to the soldering tip with glass.

7. The soldering tip of claim 1 wherein said sensor is joined to the soldering tip with ceramic material.

8. The soldering tip of claim 1 wherein said sensor is joined to the soldering tip with silver solder.

9. A soldering tip for conducting heat from a heat source external to said soldering tip to an application site, comprising:
- a heat receiving end including means for coupling the soldering tip to an external heat source;
- a heat emitting end forming a working surface for contacting an application site and conducting heat thereto; and
- a thermocouple embedded with the soldering tip and spaced from said working surface a distance of about 0 to 2.5 mm therefrom, said soldering tip having an outside diameter of less than 0.25".

10. A soldering tip assembly for conducting heat from an external heat source to an application site, comprising:
- a soldering tip having a heat receiving end including means for coupling the soldering tip to an external heat source, a heat emitting end forming a working surface for contacting an application site and conducting heat thereto, and a sensor for sensing temperature, said sensor being embedded within the soldering tip immediately adjacent said working surface and having leads extending therefrom; and
- first and second contacts being spaced from said soldering tip, one of said leads being coupled to said first contact and another one of said leads being coupled to said second contact.

11. The soldering tip assembly of claim 10 wherein said contacts are spaced from said soldering tip by a tubular spacer.

12. The soldering tip assembly of claim 11 wherein said tubular spacer comprises stainless steel.

13. The soldering tip assembly of claim 11 wherein said tubular spacer comprises brass.

14. The soldering tip assembly of claim 11 wherein an insulating member separates said contacts from said tubular spacer.

15. The soldering tip assembly of claim 14 wherein said insulating member is tubular and is coupled to said tubular spacer.

16. The soldering tip assembly of claim 10 further including a receptacle for coupling said soldering tip to a handle, said receptacle including an opening having third and fourth contacts disposed therein for engagement with said first and second contacts.

17. The soldering tip assembly of claim 16 wherein said first contact is in the form of a socket and said third contact is in the form of a prong.

18. The soldering tip assembly of claim 17 wherein said second contact is in the form of a ring and said fourth contact extends radially within said opening.

19. The soldering tip assembly of claim 18 wherein said receptacle includes a radially extending projection adjacent to said fourth contact.

20. The soldering tip assembly of claim 11 wherein the sensor is spaced from said working surface a distance about 0 to 2.5 mm therefrom.

21. A soldering system comprising:
- a soldering tip assembly including a soldering tip having an outside diameter of less than 0.25" and having end, a heat emitting end forming a working surface for contacting an application site and conducting heat thereto, and a sensor for sensing local information, said sensor being embedded within the soldering tip immediately adjacent to said working surface; and
- a processor, coupled to said soldering tip assembly and responsive to said sensor, that processes said local information.

22. The soldering system of claim 21 wherein said soldering tip assembly includes contacts spaced from said soldering tip and leads directly coupling said sensor to said contacts.

23. The soldering system of claim 22 wherein said soldering tip assembly further includes a tubular spacer between said contacts and said soldering tip, whereby said spacer spaces said contacts from said soldering tip.

24. The soldering system of claim 23 wherein said soldering tip assembly further includes an insulating member between said contacts and said tubular spacer, whereby said insulating member insulates said contacts from said tubular spacer.

25. The soldering system of claim 24 wherein said tubular spacer is coupled to said soldering tip and insulating member.

26. The soldering system of claim 21 wherein said processor compares said local information to a predetermined range of values and controls soldering tip temperature based upon the comparison.

27. The soldering system of claim 21 wherein said soldering tip assembly includes a heater coupled to the soldering tip, and said processor compares said local information to a predetermined range of values and controls power delivered to said heater based upon said comparison.

28. The soldering system of claim 27 further including a display which is coupled to said processor and which displays the local information together with the determined range of values.

29. The soldering system of claim 21 further including a display coupled to said processor for displaying said local information.

30. The soldering system of claim 21 wherein said processor stores said local information.

31. The soldering system of claim 21 further including another processor which is coupled to said first mentioned processor and which formats said local information and puts it in long-term memory.

32. The soldering system of claim 31 further including a display coupled to said another processor.

33. The soldering system of claim 32 wherein said another processor stores said local information.

34. A soldering system comprising:
- a plurality of soldering tip assemblies, each assembly including a soldering tip having an outside diameter of less than 0.25" and having end, a heat emitting end forming a working surface for contacting an application site and conducting heat thereto, and a sensor for sensing local information, wherein said sensor is embedded within the soldering tip immediately adjacent to said working surface;

a plurality of microprocessors, each microprocessor being coupled to a respective soldering tip assembly and responsive to a respective sensor, wherein said processor processes said local information; and a central processor coupled to said plurality of processors, wherein said central processor formats and puts said local information in long-term memory.

35. A soldering tip assembly for a soldering iron having a soldering tip heater external to the soldering tip, comprising:
 a. a soldering tip having an outside diameter less than 0.25″ and having
  i. a heat receiving end having an exterior surface to which the external tip heater can be coupled,
  ii. a heat emitting end forming a working surface to contact an application site and to conduct heat thereto,
  iii. a passage extending axially through said heat receiving end and said heat emitting end, having a closed axially outer end less than 2.5 mm from said working surface, and having an open axially inner end in said heat receiving end, and
  iv. a thermocouple disposed within said passage and fixed to said axially outer end of said passage and having leads extending therefrom and through said axially inner end of said passage;
 b. a tubular spacer connected to said soldering tip;
 c. a tubular insulating member supported on said tubular spacer; and
 d. first and second contacts, one of said leads being coupled to said first contact and another one of said leads being coupled to said second contact, said contact being supported on said insulating member.

36. The soldering tip assembly of claim 35 wherein said axially outer end of said passage is formed by swaging said passage closed.

* * * * *